(12) United States Patent
Wang et al.

(10) Patent No.: US 9,660,224 B2
(45) Date of Patent: May 23, 2017

(54) MOBILE ELECTRONIC DEVICE CAPABLE OF UNINTERRUPTED POWER SUPPLY DURING BATTERY REPLACEMENT

(71) Applicant: International Business Machines Corporation, Armonk, NY (US)

(72) Inventors: Wei Jie Wang, Beijing (CN); Jing You, Beijing (CN); Xiu Bin Yu, Beijing (CN); Na Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 14/819,499

(22) Filed: Aug. 6, 2015

(65) Prior Publication Data

US 2016/0064705 A1    Mar. 3, 2016

(30) Foreign Application Priority Data

Aug. 29, 2014   (CN) .......................... 2014 1 0437683

(51) Int. Cl.
*H01M 2/00* (2006.01)
*H01M 2/02* (2006.01)
*H01M 2/10* (2006.01)

(52) U.S. Cl.
CPC ....... *H01M 2/0212* (2013.01); *H01M 2/0217* (2013.01); *H01M 2/1066* (2013.01); *H01M 2220/30* (2013.01)

(58) Field of Classification Search
CPC ....................................................... H01M 2/00
See application file for complete search history.

(56) References Cited

U.S. PATENT DOCUMENTS

| | | | |
|---|---|---|---|
| 2006/0115689 A1* | 6/2006 | Lee | ..................... H01M 2/1066 429/9 |
| 2006/0176016 A1* | 8/2006 | Kok | ..................... H01M 2/1066 320/114 |

* cited by examiner

*Primary Examiner* — Jacob Marks
(74) *Attorney, Agent, or Firm* — Daniel R. Simek

(57) ABSTRACT

A mobile electronic device comprising an internal circuit and a battery compartment having an entrance and an exit. The battery compartment comprises a first conductor and a second conduct at the inner side of the battery compartment. The first conductor comprises at least two conductive contacts electrically connected to the internal circuit and having a distance from each other in the direction from the battery entrance to the battery exit so that, while a backup battery is sliding into the battery compartment from the battery entrance and pushing out a current battery through the battery exit, the first conductor may maintain electrical connection with conductive belt of the current battery and/or the backup battery. The structure of the second conductor is similar that of the first conductor and may maintain electrical connection with conductive belt of the current battery and/or the backup battery.

12 Claims, 4 Drawing Sheets

MOBILE ELECTRONIC DEVICE CAPABLE OF UNINTERRUPTED POWER SUPPLY DURING BATTERY REPLACEMENT

CROSS-REFERENCE TO RELATED APPLICATION

This application claims priority under 35 U.S.C. §119 to China Patent Application No. 201410437683.7 filed Aug. 29, 2014, the entire contents of which are incorporated herein by reference.

BACKGROUND OF THE INVENTION

Embodiments of the invention relate to mobile electronic devices and, in particular, to a mobile electronic device without interruption of power supply at the time of battery replacement.

A mobile electronic device, such as a mobile phone, is powered with a battery. If the power of the battery in use is depleting, and the battery cannot be charged timely, it may be replaced with a backup battery. However, the battery replacement will cause the mobile electronic device to be powered off.

SUMMARY

One of the objects of the invention is to provide an improved battery compartment and a battery for a mobile electronic device so that replacing a current battery with a backup battery will not lead to the interruption of the power supply of the mobile electronic device.

Embodiments of the present invention provide a mobile electronic device comprising an internal circuit and a battery compartment, wherein the battery compartment has a battery entrance and a battery exit.

The battery compartment includes a first conductor at the inner side of the battery compartment, which comprises at least two conductive contacts. The at least two conductive contacts of the first conductor are electrically connected to the internal circuit and have a distance from each other in the direction from the battery entrance to the battery exit so that, while a backup battery is sliding into the battery compartment from the battery entrance and pushing out a current battery in the battery compartment through the battery exit, the at least two conductive contacts of the first conductor are either both in contact with a positive conductive belt of the current battery or a positive conductive belt of the backup battery, or respectively in contact with the positive conductive belt of the current battery and the positive conductive belt of the backup battery.

Further, the battery compartment includes a second conductor provided at the inner side of the battery compartment, which comprises at least two conductive contacts. The at least two conductive contacts of the second conductor are electrically connected to the internal circuit and have a distance from each other in the direction from the battery entrance to the battery exit so that, while a backup battery is sliding into the battery compartment from the battery entrance and pushing out a current battery in the battery compartment through the battery exit, the at least two conductive contacts of the second conductor are either both in contact with a negative conductive belt of the current battery or a negative conductive belt of the backup battery at the same time, or respectively in contact with the negative conductive belt of the current battery and the negative conductive belt of the backup battery.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments of the disclosure will be described in more detail with reference to the accompanying drawings, in which the preferable embodiments of the present disclosure are illustrated. However, it shall be appreciated that the present disclosure can be implemented in various manners, and thus should not be construed to be limited to the embodiments disclosed herein. On the contrary, those embodiments are provided for the thorough and complete understanding of the present disclosure and completely conveying the scope of the present disclosure to those skilled in the art.

For illustration, in the following, a mobile phone will be taken as an example of mobile electronic device.

Figure 1:
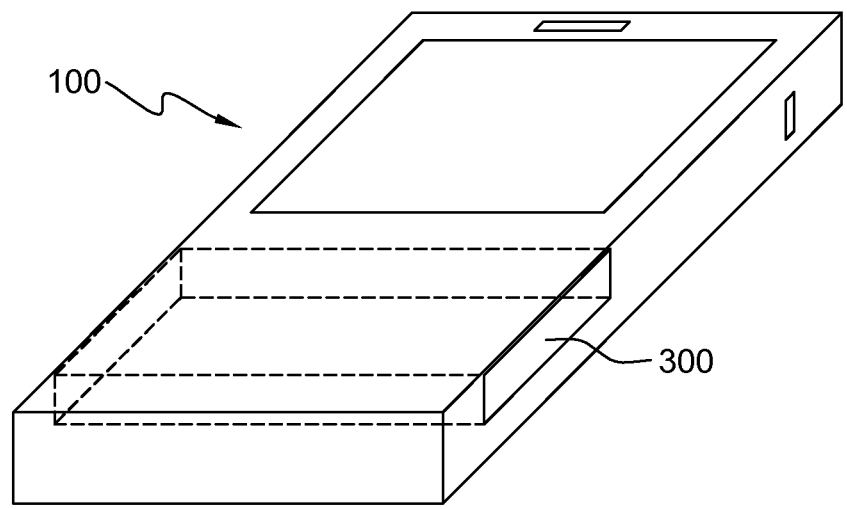
FIG. 1 is a perspective view of the mobile electronic device according to an embodiment of the invention.

Refer to FIG. 1, a perspective view of the mobile electronic device according to an embodiment of the invention. The mobile electronic device 100 shown in FIG. 1 is a mobile phone, which comprises an internal circuit (not shown) and a battery compartment 300 for accommodating a battery.

Figure 2:
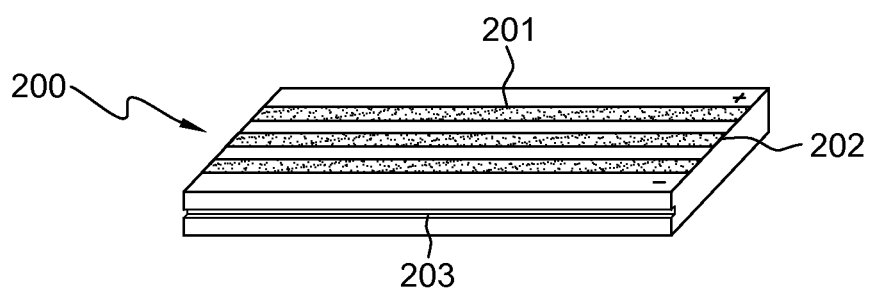
FIG. 2 is a three-dimensional view of the battery of the mobile electronic device suitable for use with an embodiment of the invention.

Refer to FIG. 2, which schematically represents a three-dimensional view of the battery 200 suitable for use with a mobile electronic device 100. As shown in FIG. 2, the battery 200 comprises a positive conductive belt 201 and a negative conductive belt 202 arranged on the outside surface of the battery.

Figure 3A:
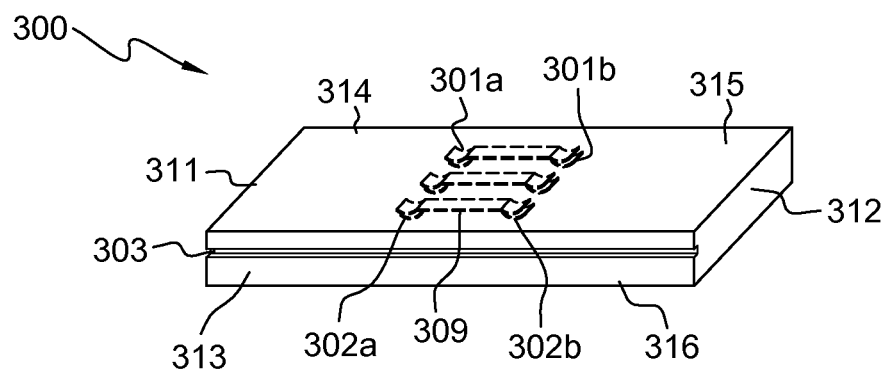
FIG. 3A is a three-dimensional view of the battery compartment of the mobile electronic device according to an embodiment of the invention.

Refer to FIG. 3A, a three-dimensional diagram of the battery compartment 300 of the mobile electronic device according to an embodiment of the invention.

As shown in the Figure, battery compartment 300 includes a battery entrance 311 (hereinafter also referred to as "the entrance") and a battery exit 312 (hereinafter also referred to as "the exit") located, respectively, at the left side and the right side of the battery compartment 300, such that a battery 200 may slide into the battery compartment via the battery entrance 311 and may slide out of the battery compartment via the battery exit 312.

The battery compartment as shown is in a rectangular shape and has a front inner side 313, a back inner side 314, a top inner side 315, and a bottom inner side 316.

As indicated by the dotted lines in FIG. 3A, battery compartment 300 also comprises a first conductor and a second conductor arranged on the inner side (top inner side 315) of battery compartment 300. The first conductor comprises at least two conductive contacts 301a and 301b, which are electrically connected to the internal circuit (not shown) within the mobile phone. The second conductor comprises at least two conductive contacts 302a and 302b, which similarly are electrically connected to the internal circuit within the mobile phone.

Figure 3B:
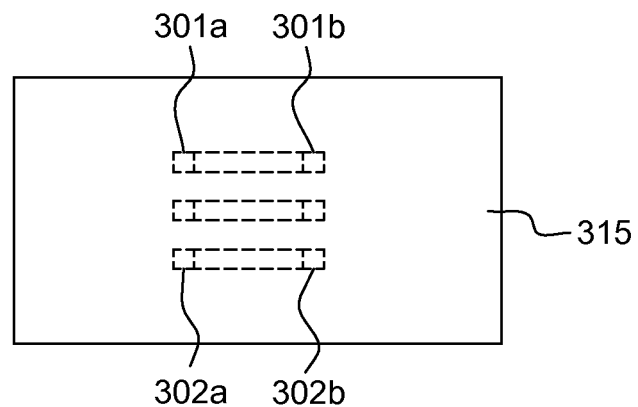
FIG. 3B is a top view of the battery compartment of the mobile electronic device according to an embodiment of the invention.
Figure 3C:
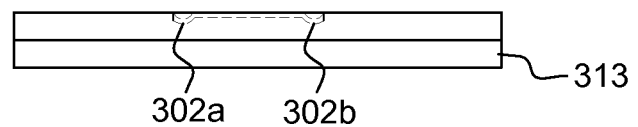
FIGS. 3C and 3D are front side views of the battery compartment of the mobile electronic device according to an embodiment of the invention.
Figure 3D:
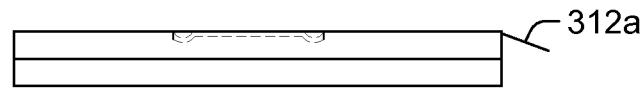

FIG. 3B is a top view of battery compartment 300, in which the components denoted by reference marks 315, 301a, 301b, 302a, and 302b are the same as those denoted by like reference marks in FIG. 3A, and thus will not be discussed herein. FIG. 3C is a front side view of battery compartment 300, in which the components denoted by reference marks 313, 302a, and 302b are same as those denoted by like reference marks in FIG. 3A, and thus will not be discussed herein. FIG. 3D is another front side view of battery compartment 300, which indicates that, according to an embodiment of the invention, a compartment door 312a may be provided at the battery exit 312 of battery compartment 300. Additionally, a compartment door (not shown) may also be provided at the battery entrance 311.

Figure 4A:
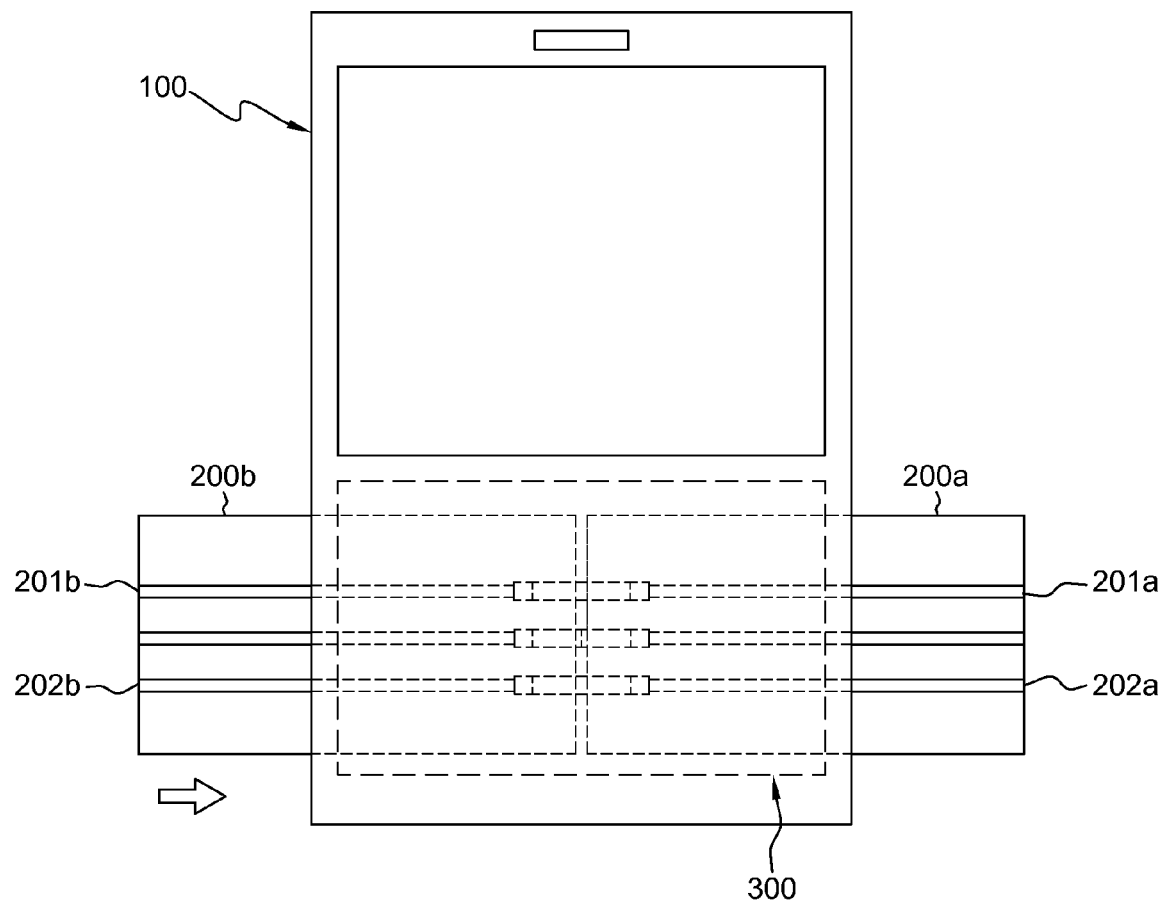
FIGS. 4A-4C are, respectively, a top view, a front view, and a three-dimensional view illustratively showing a process of replacing the battery of the mobile electronic device in accordance with an embodiment of the invention.
Figure 4B:
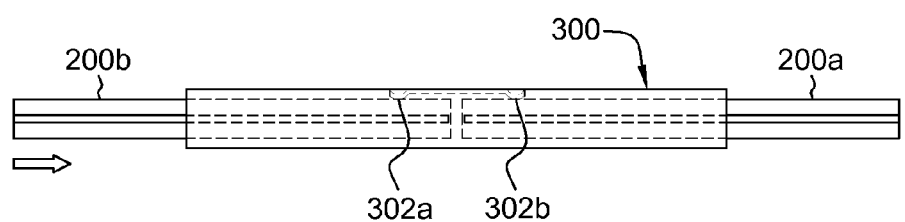
Figure 4C:
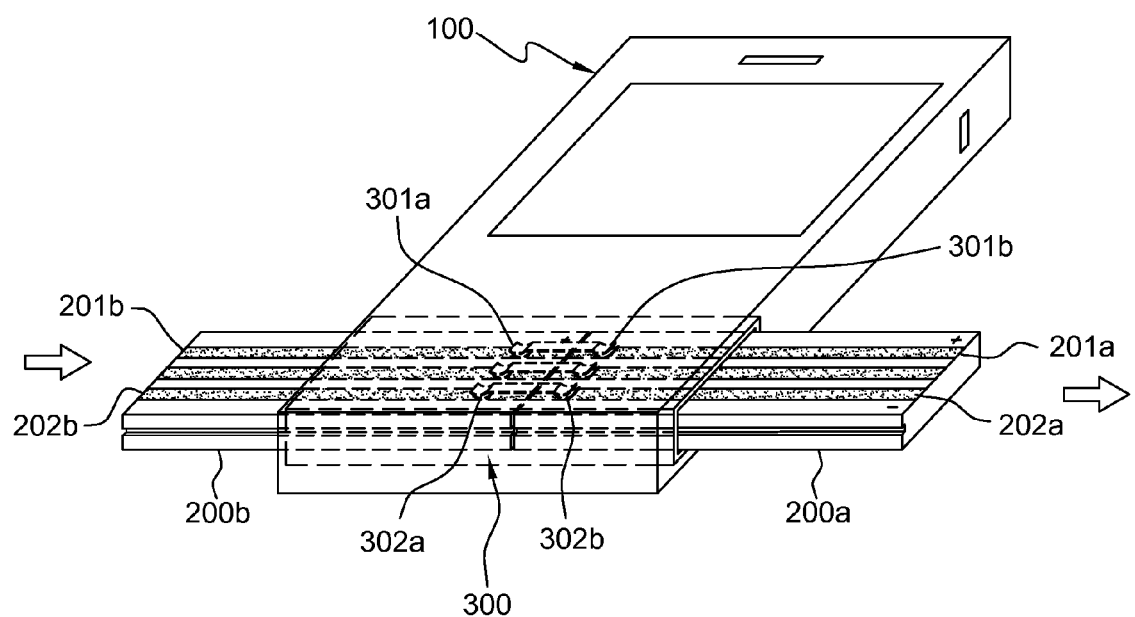

Refer to FIGS. 3A and 3B and further to FIGS. 4A-4C, which schematically show a process of replacing the battery of the mobile electronic device, in accordance with an embodiment of the invention. Conductive contacts 301a and 301b of the first conductor have a distance relative to each other in the direction of the battery entrance to the battery exit so that, while a backup battery is sliding into the battery compartment from the battery entrance 311 and pushing out a current battery in the battery compartment through the battery exit 312, conductive contacts 301a and 301b of the first conductor are either both in contact with positive conductive belt 201a of the current battery or positive conductive belt 201b of the backup battery, or respectively in contact with positive conductive belt 201a of the current battery and positive conductive belt 201b of the backup battery.

Similarly, the second conductor comprises at least two conductive contacts 302a and 302b having a distance relative to each other in the direction of the battery entrance to the battery exit so that, while a backup battery is sliding into the battery compartment from the battery entrance 311 and pushing out a current battery in the battery compartment through the battery exit 312, conductive contact 302a and 302b are either both in contact with negative conductive belt 202a of the current battery or negative conductive belt 202b of the backup battery, or respectively in contact with negative conductive belt 202a of the current battery and negative conductive belt 202b of the backup battery.

FIGS. 4A-4C are respectively a top view, a front view, and a three-dimensional view illustratively showing a process of replacing the battery of the mobile electronic device 100. Specifically, FIGS. 4A-4C depict an intermediate state in the process of replacing current battery 200a with backup battery 200b as the power of current battery 200a in battery compartment 300 is depleting. The structure of both current battery 200a and backup battery 200b is the same as the structure of battery 200 shown in FIG. 2.

Before being replaced, current battery 200a is inside battery compartment 300. At this time, conductive contacts 301a and 301b are both in contact with positive conductive belt 201a of current battery 200a, conductive contacts 302a and 302b are both in contact with negative conductive belt 202b of current battery 200a, and the internal circuit of mobile electronic device 100 is in energized state.

As indicated by the arrow at the lower left corner of the Figure (FIGS. 4A-4C), in replacing the battery, backup battery 200b is pushed into battery compartment 300 from the battery entrance 311 at the left side, and backup battery 200b pushes current battery 200a out of the battery exit 312 at the right side. When positive conductive belt 201a of current battery 200a is detached from conductive contact 301a, positive conductive belt 201a is still in contact with conductive contact 301b. Because there is a distance between conductive contacts 301a and 301b in the direction of the battery entrance to the battery exit, namely, in the sliding direction of the backup battery, as soon as conductive contact 301a is detached from positive conductive belt 201a, conductive contact 301a is in contact with positive conductive belt 201b of backup battery 200b. Similarly, when negative conductive belt 202a of current battery 200a is detached from conductive contact 302a, conductive belt 202a is still in contact with conductive contact 302b, and after conductive contact 302a is detached from negative conductive belt 202a, conductive contact 302a is in contact with negative conductive belt 202b of backup battery 200b. This state is shown in FIGS. 4A-4C. At this time, current battery 200a, via conductive contacts 301b and 302b, and backup battery 200b, via conductive contacts 301a and 302a, provide power supply in parallel to the internal circuit of mobile electronic device 100, and the energized state of the internal circuit is maintained.

After backup battery 200b fully enters into the battery compartment, conductive contacts 301a and 301b are both in contact with positive conductive belt 201b of backup battery 200b, and conductive contacts 302a and 302b are both in contact with positive conductive belt 201b of backup battery 200b. The internal circuit of the mobile electronic device 100 is in energized state.

In the embodiment of the battery replacement process described above, the left side of the battery compartment is taken as battery entrance 311, and the right side is taken as battery exit 312. In practical designs, the entrance and the exit may be exchanged, and one of the left side and the right side of the battery compartment may serve as the entrance or the exit, while the other one serves as the exit or entrance.

Moreover, the embodiment of battery compartment 300, as shown is in the shape of cuboid, and in the Figure it is also shown front inner side 313, back inner side 314, top inner side 315, and bottom inner side 316 of the battery compartment. This kind of representation is only for convenience of description, wherein the descriptive term "up" and "down" are relative to each other; likewise, the descriptive term "front" and "back" are also relative to each other.

In the above described mobile electronic device 100, both the first conductor and the second conductor are arranged at the top inner side 315 of the battery compartment.

According to an embodiment of the invention, the first conductor and the second conductor are arranged at the bottom inner side 316 of the battery compartment.

In other words, the first conductor and the second conductor may be arranged at a same inner side of the battery compartment.

Correspondingly, according to an embodiment of the invention, positive conductive belt 201 and negative conductive belt 202 of battery 200 of mobile electronic device 100 may be arranged on a same outer side of the battery. For example, besides the above-described embodiment, in which positive conductive belt 201 and negative conductive belt 202 are arranged on the top side of battery 200, positive conductive belt 201 and negative conductive belt 202 may also be arranged on the bottom side of battery 200.

According to another embodiment of the invention, the first conductor and the second conductor may be arranged respectively at different inner sides of the battery compartment. For example, top inner side 315 and bottom inner side 316 are different inner sides of the battery compartment. The first conductor may be arranged on top inner side 315 of the battery compartment while the second conductor is arranged on bottom inner side 316 of the battery compartment. Alternatively, the first conductor may be arranged on bottom inner side 316 of the battery compartment while the second conductor is arranged on top inner side 315 of the battery compartment.

Correspondingly, according to an embodiment of the present invention, positive conductive belt 201 and negative conductive belt 202 of battery 200 may be arranged respectively at different outer sides of the battery. For example, one of them may be arranged on the top outer side of the battery while the other one is arranged on the bottom outer side of the battery.

According to an embodiment of the invention, the at least two conductive contacts of the first conductor and the at least two conductive contacts of the second conductor are, respectively, electrically connected with the internal circuit of the mobile electronic device via corresponding elastic conductors fixed to the battery compartment. For example, referring to FIG. 3A, the middle part of elastic conductor 309 (which may be a metal sheet, for example) is fixed to the inner wall of the battery compartment 300 and connected with the internal circuit (not shown). Conductive contacts 302a and 302b of the second conductor are either respectively fixed to the two ends of elastic conductor 309 or simply a part of the elastic conductor. In this way, conductive contacts 302a and 302b are electrically connected with the internal circuit. In a similar way, two conductive contacts 301a and 301b of the first conductor are connected with the internal circuit via another elastic conductor fixed to the battery compartment. According to an embodiment of the invention, the battery compartment further comprises a battery alignment device for aligning the direction of the battery so that the battery can be slid into the battery compartment and its positive conductive belt and negative conductive belt are respectively aligned with the first conductor and the second conductor.

According to an embodiment of the invention, the battery alignment device comprises at least one sliding rail fixed to the inner wall of the battery compartment, wherein the at least one sliding rail is parallel to the direction from the battery entrance to the battery exit. In other words, the direction of the at least one sliding rail is parallel to the sliding direction of the battery.

Referring to FIG. 3A, reference mark 303 denotes a sliding rail (sliding rail 303) fixed to the inner wall of the battery compartment, and sliding rail 303 is parallel to the direction in which the battery slides from the battery entrance 311 to the battery exit 312. FIG. 3A depicts one such sliding rail. In practical implementations, more than one such sliding rail may be arranged on the inner wall of the battery compartment.

Correspondingly, battery 200 may further include a corresponding alignment device, such as at least one groove arranged at the outside of the battery, for enabling the battery to slide into the battery compartment and causing the positive conductive belt and the negative conductive belt of the battery to be respectively aligned with the first conductor and the second conductor. Referring to FIG. 2, reference mark 203 denotes a groove (groove 203) arranged at the outside of the battery 200, and groove 203 is parallel to the direction in which the battery slides from the battery entrance 311 to the battery exit 312. After groove 203 and sliding rail 303 (FIG. 3A) are aligned with each other, sliding rail 303 can fit into groove 203. Thus, the direction of the battery can be aligned so that the battery can be slid into the battery compartment and its positive conductive belt 201 and negative conductive belt 202 are respectively aligned with the first conductor 301a/301b and the second conductor 302a/302b.

The combination of sliding rail 303 of the battery compartment and groove 203 of the battery also serves to secure the battery in the battery compartment after the battery is slid in place. In addition, battery compartment 300 may further comprise a battery locking device for securing the battery in the battery compartment, and battery 200 may comprise a corresponding device or structure for matching with the battery locking device for fixing the battery. It shall be noted that the aligning and securing of the battery, which is not the focus of the present invention, may be implemented in a variety of ways found in the prior art, thus no description in detail is needed herein.

It shall be noted that, the embodiment of battery compartment 300 as shown above is in the shape of cuboid and battery 200 is also in the shape of cuboid. However, this is not the limitation to the structure of the battery compartment and the battery of the invention. According to an embodiment of the invention, the battery compartment may also be in the shape of cylinder. Accordingly, the battery may also be in the shape of cylinder. Those skilled in the art may further contemplate to employ a variety of structures. For example, the inner wall of the battery compartment and the outside surface of the battery need not to be flat; rather, they may be curve-shaped to some degree. These and other alternatives are within the scope of the invention.

The mobile electronic device, according to embodiments of the invention, can prevent the power supply of its internal circuit from being interrupted at the time of battery replacement. Compared with existing techniques with belt structure, the first conductor and the second conductor of the battery compartment employ the structure with only two conductive contacts, which may reduce the use of conductive materials, thus have significant technical effects.

The descriptions of the various embodiments of the invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A mobile electronic device comprising:
an internal circuit and a battery compartment, wherein the battery compartment includes a front inner side, a back inner side, a top inner side, a bottom inner side, a battery entrance and a battery exit, the battery compartment further comprising:
a first conductor at a first inner side of the battery compartment, wherein the first conductor includes at least two conductive contacts, wherein the at least two conductive contacts of the first conductor are electrically connected to the internal circuit and have a distance from each other in the direction from the battery entrance to the battery exit so that, while a backup battery is sliding into the battery compartment from the battery entrance and pushing out a current battery in the battery compartment through the battery exit, the at least two conductive contacts of the first conductor are either: (i) both in contact with a positive conductive belt of the current battery or a positive conductive belt of the backup battery, or (ii) respectively in contact with the positive conductive belt of the current battery and the positive conductive belt of the backup battery; and
a second conductor provided at a second inner side of the battery compartment, wherein the second inner side of the battery compartment is an opposing inner side of the battery compartment relative to the first inner side of the battery compartment, wherein the second conductor includes at least two conductive contacts, wherein the at least two conductive contacts of the second conductor are electrically connected to the internal circuit and have a distance from each other in the direction from the battery entrance to the battery exit so that, while a backup battery is sliding into the battery compartment from the battery entrance and pushing out a current battery in the battery compartment through the battery exit, the at least two conductive contacts of the second conductor are either: (i) both in contact with a negative conductive belt of the current battery or a negative conductive belt of the backup battery at the same time, or (ii) respectively in contact with the negative conductive belt of the current battery and the negative conductive belt of the backup battery.

2. The mobile electronic device according to claim 1, wherein the first inner side is the top inner side of the battery compartment and the second inner side is the bottom inner side of the battery compartment.

3. The mobile electronic device according to claim 1, wherein the at least two conductive contacts of the first conductor and the at least two conductive contacts of the second conductor are, respectively, electrically connected with the internal circuit of the mobile electronic device via corresponding elastic conductors fixed to the battery compartment.

4. The mobile electronic device according to claim 2, wherein the at least two conductive contacts of the first conductor are arranged at the top inner side and the at least two conductive contacts of the second conductor are arranged at the bottom inner side are, respectively, electrically connected with the internal circuit of the mobile electronic device via corresponding elastic conductors fixed to the battery compartment.

5. The mobile electronic device according to claim 1, wherein the battery compartment further comprises:
a battery alignment device for aligning the direction of a battery so that the backup battery can slide into the battery compartment and a positive conductive belt and a negative conductive belt of the backup battery are respectively aligned with the first conductor and the second conductor.

6. The mobile electronic device according claim 5, wherein the battery alignment device comprises:
at least one sliding rail fixed to the inner wall of the battery compartment, wherein the at least one sliding rail is parallel to the direction from the battery entrance to the battery exit.

7. The mobile electronic device according claim 1, wherein the battery compartment further comprises:
a battery locking device for securing the battery in the battery compartment.

8. The mobile electronic device according to claim 1, wherein the front inner side, the back inner side, the top inner side, and the bottom inner side at least partially enclose the backup battery and the current battery in the battery compartment.

9. The mobile electronic device according to claim 1, wherein the first inner side is the bottom inner side of the battery compartment and the second inner side is the top inner side of the battery compartment.

10. The mobile electronic device according to claim 1, wherein the battery compartment is in a shape of a cuboid and a battery of the mobile electronic device is in a shape of a cuboid that fits within the battery compartment and maintains contact with first conductor and the second conductor.

11. The mobile electronic device according to claim 1, wherein the battery compartment is in a shape of a cylinder and a battery of the mobile electronic device is a shape of a cylinder that fits within the battery compartment and maintains contact with first conductor and the second conductor.

12. The mobile electronic device according to claim 9, wherein the at least two conductive contacts of the first conductor are arranged at the bottom inner side and the at least two conductive contacts of the second conductor are arranged at the top inner side are, respectively, electrically connected with the internal circuit of the mobile electronic device via corresponding elastic conductors fixed to the battery compartment.

* * * * *